July 9, 1940.   R. F. HINKLEY, SR   2,207,403
BOWLING BALL GRIP GAUGE
Filed Jan. 7, 1939
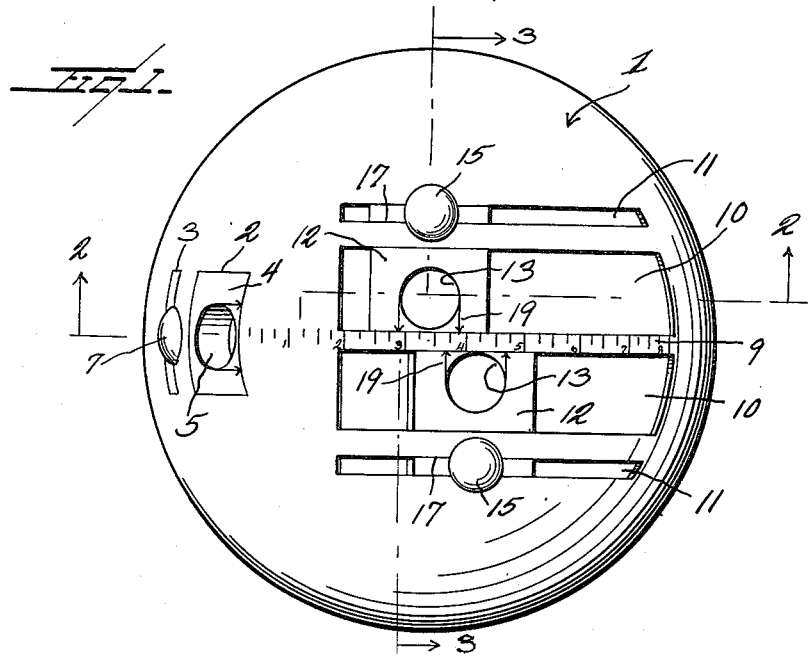
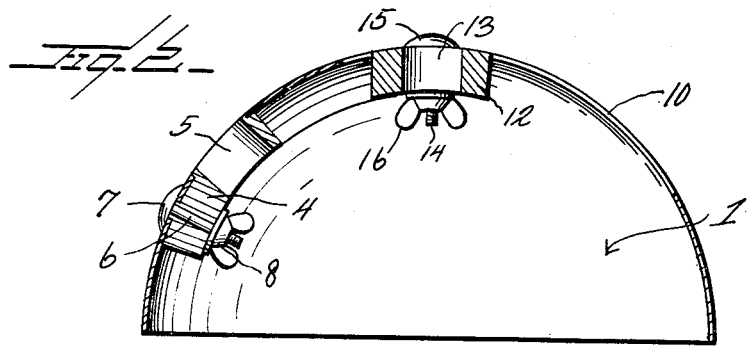
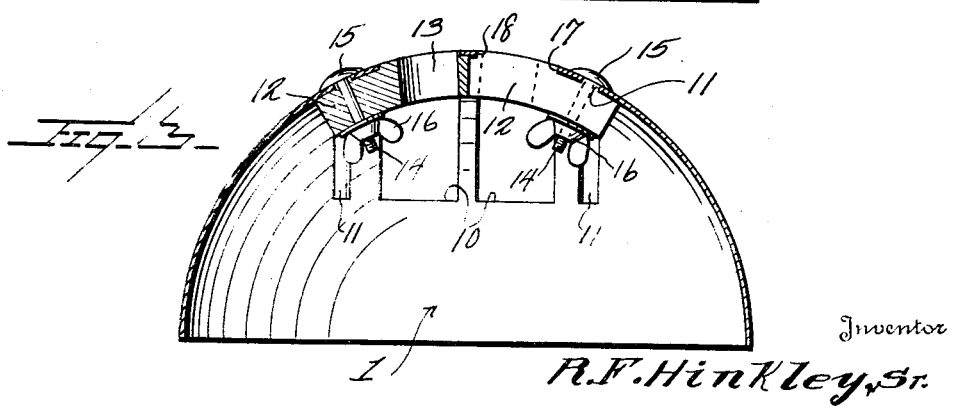
Inventor
R. F. Hinkley, Sr.
By Watson E. Coleman
Attorney Patented July 9, 1940

2,207,403

UNITED STATES PATENT OFFICE 2,207,403

BOWLING BALL GRIP GAUGE

Robert F. Hinkley, Sr., Pasadena, Calif.

Application January 7, 1939, Serial No. 249,813

16 Claims. (Cl. 33—174)

This invention relates to improvements in gauge devices for measuring the finger span for the finger openings of a bowling ball.

The present invention has for its primary object to provide a novel gauge device for measuring the distance from the inside of the thumb at the palm of the hand to the various fingers at the second joint of each for the purpose of finding the exact span of the hand for a bowling ball grip.

Another object of the invention is to provide a grip gauge for a bowling ball wherein novel means is provided for adjustably securing the finger receiving portions of the gauge whereby the desired measurement may be easily and quickly made.

Still another object of the invention is to provide in a gauge device of the character described, adjustable block members mounted in a semisphere for movement relative to one another and to a fixed block containing a thumb hole in association with a gauge or measuring strip by means of which the distances between the thumb and certain fingers of the hand may be readily and accurately determined so that a bowling ball may be made with finger grip holes or sockets to accurately fit the bowler's hand.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Figure 1 is a view in top plan of the semispherical bowling ball gauge or grip gauge embodying the present invention.

Figure 2 is a section taken on the line 2—2 of Figure 1.

Figure 3 is a section taken on the line 3—3 of Figure 1.

Referring now more particularly to the drawing, the numeral 1 generally designates the body of the present gauge device which is formed of a suitable material in the shape of a hollow semisphere, the under or bottom side being open so that access may be conveniently had to the interior of the body for the purpose of adjusting or changing the finger blocks.

The numeral 2 designates an aperture in the wall of the body adjacent which is a slot 3 and disposed within the body in covering relation with this aperture and slot, is a thumb block 4 having a thumb hole 5 therein, which is exposed through the opening or aperture 2, as shown. The top surface of the block 4 is shaped or formed so that a portion thereof of the same dimensions as the aperture 2 will project into the aperture and an adjacent portion of the same dimensions as the slot 3 will project into this slot, these portions being flush with the outer curved surface of the body 1, as shown in Figure 2.

A securing bolt 6 extends through the portion of the thumb block 4 which lies beneath the slot 3 and this bolt has a relatively wide head 7 which covers the slot so as to retain the block 4 in position when the thumb screw 8 is threaded onto the inner end of the bolt against the inner side of the block, as shown in Figure 2.

Formed upon the surface of the body 1 and extending from the radial center of the hole of the thumb block 4 in a linear scale 9 which is laid off in inches or other suitable units of measurement and paralleling this scale and lying upon opposite sides thereof are the two finger block slots 10. Upon the outer side of each of the slots 10 is a bolt slot 11.

Each of the slots 10 receives a portion of a finger block 12 in which is a finger opening 13. These finger blocks are of a width materially greater than the combined widths of the adjacent slots 10 and 11 so that each also has a portion extending across the adjacent slot 11 and into the same in the same manner as the thumb block 4. Each of the finger blocks likewise has a securing bolt 14 passing therethrough, through the area thereof which is exposed through a slot 11 and such bolt has a wide or large flat head 15 which slidably engages the surface of the body at the sides of the slot 11 to secure the block in place when the wing nut or screw 16 is threaded up on the opposite end of the bolt, as shown in Figure 3, to bear against the inner side of the block. This draws the block tightly against the inner side of the body so that the top face thereof is maintained flush with the outer surface of the body. By reason of the formation of the top surfaces of each of the blocks to receive the elongated openings 10 and recesses 11, there are formed across the top face of each block a cross channel 17 and parallel edge grooves 18 which facilitate the sliding of the blocks 12 lengthwise of the openings or slots 10 and 11 in which the faces thereof are engaged.

Each of the apertures 13 of the finger blocks 12, as well as the aperture 5 of the thumb block, is formed close to the inner side of the groove 18 which is remote from the channel 17 so that when the finger blocks are in position, these finger openings or holes 13 will lie in close proximity to the edge of the scale 9.

Extending tangentially from opposite sides of each block hole toward the adjacent groove 18 are pointer lines 19 which, when the blocks 12 are in place, are directed toward the adjacent measuring scale 9.

It will be understood that all of the blocks are of the same overall dimensions so that while the block 4 has been referred to as a thumb block it may on occasion be used as a finger block in one of the openings 10, or one of the blocks 12, referred to as a finger block, might be employed in the opening 2 as a thumb block. This will depend upon the size of the fingers and thumb of the person whose grip span is being measured. The sizes of the apertures in the various blocks may vary and in practice there would be provided a set of these blocks in which the openings are scaled from a minimum to a maximum size. When the grip span of a particular person is to be measured, that person would first select those blocks from the set which have holes of the proper size to receive his thumb and fingers and then the selected blocks would be placed in position in the proper openings of the gauge body 1.

After placing the blocks in the body 1, the securing bolts for the finger blocks would be left loosened sufficiently to permit those blocks to be shifted while the fingers of the hand are engaged therein and while the thumb of the hand is engaged in the hole of the thumb block. With the thumb inserted into the thumb block to the point where the second joint would engage the edge of the hole, the fingers would be engaged in the holes 13 of the finger blocks with the second joints thereof at the edges of the holes. The finger block holding nut 16 having been previously loosened, the finger blocks are freely slidable to assume the positions determined by the hand span of the particular individual being measured. Variations in finger lengths will be automatically compensated for as the blocks assume the positions determined by the finger and thumb spacing of the individual. The securing nuts 16 will then be tightened to hold the blocks 12 in place and after the hand is removed the exact measurements will be shown by the arrows or pointer lines 19 upon the measuring scale 9.

While the present illustration of the invention shows finger hole grips or blocks for two fingers only, it is to be understood that the device may be made for three fingers upon the same principle.

The body 1 may, as previously stated, be formed of any suitable material either by casting, carving, turning or stamping the same and is made to have a four and one-half inch radius or to represent the half of a nine inch sphere. The thickness of the material forming the semisphere may be made in accordance with the desires of a manufacturer to give a device of the greatest durability.

I claim:

1. A bowling ball grip gauge comprising a body, means in the body for receiving a thumb of the hand, means in the body for receiving certain fingers of the hand, said finger receiving means being movable relative to one another and to the thumb receiving means, means for locking said finger receiving means in individually adjusted positions, and gauge means for determining the distance between the finger receiving means and said thumb receiving means.

2. A bowling ball grip gauge, comprising a body having a pair of parallel slots formed therein, a body in and movable longitudinally of each slot, each of said bodies having a finger hole therein, a linear measuring gauge extending longitudinally of and between the slots, and means in the body at one end of the gauge for receiving a thumb whereby the distance between the thumb and the fingers engaged in the holes of said movable bodies may be measured.

3. In a bowling ball grip gauge, a body having a curved top surface, means in said surface for receiving a thumb of the hand, a linear measuring scale extending from said thumb receiving means, a pair of blocks carried by said body and adapted to be moved in parallel paths upon opposite sides of said scale, said blocks each having a face flush with the outer surface of the body, and means for securing the blocks in adjusted position relative to the thumb receiving means.

4. In a bowling ball grip gauge, a body having a curved top surface, means in said surface for receiving a thumb of the hand, a linear measuring scale extending from said thumb receiving means, a pair of blocks carried by said body and adapted to be moved in parallel paths upon opposite sides of said scale, said blocks each having a face flush with the outer surface of the body, and means for securing the blocks in adjusted position relative to the thumb receiving means, said blocks being independently movable lengthwise of the scale.

5. A bowling ball grip gauge, comprising a hollow semi-spherical body, a linear scale upon the outer surface of said body, the body having a pair of parallel openings in the wall thereof extending lengthwise of the scale and upon opposite sides of the same, a block body engaged against the inner side of the wall of the semi-spherical body and extending across each of said slots and having a portion extending into the slot flush with the outer surface of the semi-spherical body, each of said block bodies having a finger receiving hole therein which is in close proximity to the adjacent scale, the block bodies being slidable lengthwise of the slots, means for securing the block bodies in adjusted positions in the slots, and means at one end of said scale for receiving the thumb.

6. A bowling ball grip gauge, comprising a hollow semi-spherical body, a linear scale upon the outer surface of said body, the body having a pair of parallel openings in the wall thereof extending lengthwise of the scale and upon opposite sides of the same, a block body engaged against the inner side of the wall of the semi-spherical body and extending across each of said slots and having a portion extending into the slot flush with the outer surface of the semi-spherical body, each of said block bodies having a finger receiving hole therein which is in close proximity to the adjacent scale, the block bodies being slidable lengthwise of the slots, means for securing the block bodies in adjusted positions in the slots, said semi-spherical body having an opening in the wall thereof at one end of said scale, a block disposed against the inner side of the said wall in covering relation with said opening and having a portion extended into the opening and flush with the outer surface of the semi-spherical body, said last block body having a thumb hole therein, the center of which is on the longitudinal center of said scale.

7. A bowling ball grip gauge, comprising a hollow semi-spherical body, a linear scale upon the outer surface of said body, the body having a pair of parallel openings in the wall thereof extending lengthwise of the scale and upon opposite sides of the same, a block body engaged against the inner side of the wall of the semi-spherical body and extending across each of said slots and having a portion extending into the slot flush with the outer surface of the semi-spherical body, each of said block bodies having a finger receiving hole therein which is in close proximity to the adjacent scale, the block bodies being slidable lengthwise of the slots, means for securing the block bodies in adjusted positions in the slots, said semi-spherical body having an opening in the wall thereof at one end of said scale, a block disposed against the inner side of the said wall in covering relation with said opening and having a portion extended into the opening and flush with the outer surface of the semi-spherical body, said last block body having a thumb hole therein, the center of which is on the longitudinal center of said scale, the said bodies being interchangeable between the slots and the opening in the wall of the semi-spherical body.

8. A bowling ball grip gauge, comprising a hollow semi-spherical body, a linear measuring scale upon the outer surface of said body, said body having two parallel wide slots in parallel relation with and extending lengthwise of the scale upon opposite sides of the same, there being a narrow slot parallel with and adjacent the outer side of each wide slot, a block body disposed against the inner side of the semi-spherical body and extending across each wide slot and the adjacent narrow slot, each block body having a portion extended into the adjacent slots to lie flush with the outer surface of the semi-spherical body, a finger hole formed in each block in close proximity to the said scale, a bolt member passing through each block and through the adjacent narrow slot and having a head overlying the edges of the narrow slot, the opposite end of each bolt carrying a nut adapted to be threaded against the inner side of the adjacent block, and means at one end of said scale for receiving the thumb when certain fingers of the hand are engaged in the holes of said blocks.

9. A gauge for determining the requisite digit hole spacing for individual bowlers, comprising a body provided with a thumb hole, and a plurality of finger hole members individually adjustable on said body in conformity with the spacing of the digits inserted in said holes.

10. A gauge for determining the requisite digit hole spacing for individual bowlers, comprising a body provided with a thumb hole, a plurality of digit hole members individually adjustable on said body in conformity with the spacing of the digits inserted in said holes, and means whereby the spacing of said holes when positioned may be ascertained.

11. A bowling ball grip gauge comprising a body having a thumb hole, and a plurality of members presenting outwardly opening digit receiving holes, said members being individually adjustable on said body relatively to the thumb hole to conform to the digit spacing of the hand of a user.

12. A bowling ball grip gauge comprising a body, a plurality of members presenting outwardly opening digit receiving holes, adjustable on said body into positions conforming to the digit spacing of the hand of a user, and means for indicating the adjusted positions of said members.

13. A bowling ball grip gauge comprising a body of external convexity corresponding with the contour of a bowling ball, a plurality of blocks each provided with an individual digit-receiving hole, and means for detachably mounting said blocks on said body, one at least of said blocks being adjustable on said body to accommodate the spacing between said digit holes to the digit spacing of the user.

14. A bowling ball grip gauge comprising a body presenting a spherical exterior conforming to the contour of a bowling ball, a plurality of blocks provided with digit-receiving holes detachably mounted on said body, at least one of said blocks being adjustable circumferentially of the body to conform to the digit spacing of a user, and means for locking the adjustable blocks in adjusted position.

15. A bowling ball grip gauge comprising a semi-spherical body conforming in dimensions to a segment of a bowling ball, a replaceable block provided with a thumb hole detachably mounted on said body with its outer face substantially flush with the outer surface of the body, a replaceable block provided with a finger hole detachably mounted on said body with the outer face thereof substantially flush with the surface of the body, said finger hole block being adjustable circumferentially of the body to vary the spacing between said finger hole and said thumb hole, and means for locking said finger hole block in adjusted position.

16. A bowling ball grip gauge of spherical convexity corresponding with that of a bowling ball, comprising a body portion provided with an outwardly opening digit-receiving hole, a second portion mounted on said first portion and provided with an outwardly opening digit-receiving hole, one of said portions being adjustable relatively to the other under the pressure of the digits of the user received in said holes to permit the holes to be positioned at different distances corresponding with the spacing of the digits of the user, and manually operable means for locking said portions in adjusted position for accurate measurement of the spacing between said holes.

ROBERT F. HINKLEY, Sr.